(12) United States Patent
Amano

(10) Patent No.: US 12,497,499 B2
(45) Date of Patent: Dec. 16, 2025

(54) POLYMER COMPOSITION PRODUCTION METHOD

(71) Applicant: ENEOS MATERIALS CORPORATION, Tokyo (JP)

(72) Inventor: Yusuke Amano, Tokyo (JP)

(73) Assignee: ENEOS MATERIALS CORPORATION, Tokyo (JP)

( * ) Notice: Subject to any disclaimer, the term of this patent is extended or adjusted under 35 U.S.C. 154(b) by 728 days.

(21) Appl. No.: 17/782,943

(22) PCT Filed: Dec. 3, 2020

(86) PCT No.: PCT/JP2020/044999
§ 371 (c)(1),
(2) Date: Jun. 6, 2022

(87) PCT Pub. No.: WO2021/112167
PCT Pub. Date: Jun. 10, 2021

(65) Prior Publication Data
US 2023/0033703 A1    Feb. 2, 2023

(30) Foreign Application Priority Data
Dec. 6, 2019    (JP) .................................. 2019-221071

(51) Int. Cl.
C08K 13/02    (2006.01)

(52) U.S. Cl.
CPC .................................... C08K 13/02 (2013.01)

(58) Field of Classification Search
CPC . C08K 13/02; C08K 3/06; C08K 3/36; C08K 5/09; C08K 5/17; C08K 5/31; C08K 5/54; Y02T 10/86; C08C 19/14; C08C 19/22; C08C 19/25; C08F 236/10; C08F 8/42
See application file for complete search history.

(56) References Cited

U.S. PATENT DOCUMENTS

| | | | |
|---|---|---|---|
| 11,155,706 B2 | 10/2021 | Kawai et al. | |
| 2005/0159554 A1 | 7/2005 | Endou et al. | |
| 2011/0160388 A1 | 6/2011 | Tanaka et al. | |
| 2013/0324657 A1 | 12/2013 | Okada et al. | |
| 2016/0009842 A1 | 1/2016 | Yanagisawa | |
| 2016/0208023 A1 | 7/2016 | Lee et al. | |
| 2017/0009057 A1 | 1/2017 | Lee et al. | |
| 2018/0112015 A1 | 4/2018 | Mun et al. | |
| 2018/0355155 A1 | 12/2018 | Nukaga | |
| 2019/0194430 A1 | 6/2019 | Morishita et al. | |
| 2019/0264012 A1 | 8/2019 | Hishikawa | |
| 2019/0367722 A1 | 12/2019 | Kawai et al. | |
| 2020/0172682 A1 | 6/2020 | Tani et al. | |
| 2020/0307315 A1 | 10/2020 | Aoki et al. | |

FOREIGN PATENT DOCUMENTS

| | | |
|---|---|---|
| CN | 102083889 A | 6/2011 |
| CN | 103339183 A | 10/2013 |
| CN | 105008453 A | 10/2015 |
| CN | 106068301 A | 11/2016 |
| CN | 108473599 A | 8/2018 |
| EP | 3 988 610 A1 | 4/2022 |
| EP | 4 029 911 A1 | 7/2022 |
| JP | 2006-290986 A | 10/2006 |
| JP | 2010-132168 A | 6/2010 |
| JP | 2010-254858 A | 11/2010 |
| JP | 2011-126929 A | 6/2011 |
| JP | 2015-131955 A | 7/2015 |
| JP | 2016-132764 A | 7/2016 |
| JP | 2016-528369 A | 9/2016 |
| JP | 2017-508841 A | 3/2017 |
| JP | 2018-95777 A | 6/2018 |
| JP | 2018-177894 A | 11/2018 |
| JP | 2019-26685 A | 2/2019 |
| JP | 2019-89911 A | 6/2019 |
| JP | 2019-206697 A | 12/2019 |
| KR | 10-2014-0008341 A | 1/2014 |
| TW | 201809025 A | 3/2018 |
| WO | WO 2003/087171 A1 | 10/2003 |
| WO | WO 2009/133888 A1 | 11/2009 |
| WO | WO 2012/111640 A1 | 8/2012 |
| WO | WO 2014/132666 A1 | 9/2014 |
| WO | WO 2017/115996 A1 | 7/2017 |
| WO | WO 2017/126629 A1 | 7/2017 |
| WO | WO 2017/221943 A1 | 12/2017 |
| WO | WO-2019/035443 A1 | 2/2019 |

(Continued)

OTHER PUBLICATIONS

English machine translation of JP 2018-177894. (Year: 2018).*
Japanese Notice of Reasons of Refusal issued Jul. 9, 2024 in Japanese Application No. 2021-545242 with Computer-generated English translation, 9 pgs.
Combined Chinese Office Action and Search Report issue on Feb. 22, 2023 in Chinese Patent Application No. 202080054521.9 (with unedited computer-generated English translation), 16 pages.
Korean Office Action issued on Apr. 3, 2023 in Korean Patent Application No. 10-2021-7036161 (with unedited computer-generated English translation), 11 pages.
Chinese Office Action issued Sep. 10, 2023 in Chinese Application 202080054521.9, (with unedited computer-generated English translation), 9 pages.
U.S. Office Action issued Sep. 23, 2024, in U.S. Appl. No. 17/618,493.
Chinese Office Action issued Mar. 28, 2024 in Chinese Patent Application No. 202080054521.9 (with unedited computer-generated English translation), 10 pages.

(Continued)

*Primary Examiner* — Angela C Scott
(74) *Attorney, Agent, or Firm* — Oblon, McClelland, Maier & Neustadt, L.L.P.

(57) ABSTRACT

A method of producing a polymer composition is provided, including: kneading (A) a conjugated diene-based polymer that is a polymer of a conjugated diene compound or a copolymer of a conjugated diene compound and an aromatic vinyl compound, and is a reaction product between an active polymerization end and a compound represented by any one of the general formulae (1) to (3), and (B) a basic compound having an acid dissociation constant of 8.0 or more; and kneading a kneaded product from (A) and a crosslinking agent.

8 Claims, No Drawings

(56) References Cited

FOREIGN PATENT DOCUMENTS

| WO | WO 2019/117214 A1 | 6/2019 |
| --- | --- | --- |
| WO | WO 2020/196220 A1 | 10/2020 |
| WO | WO 2020/255823 A1 | 12/2020 |
| WO | WO 2021/020189 A1 | 2/2021 |
| WO | WO 2021/049377 A1 | 3/2021 |
| WO | WO 2021/125259 A1 | 6/2021 |
| WO | WO 2021/256419 A1 | 12/2021 |
| WO | WO 2022/024219 A1 | 2/2022 |

OTHER PUBLICATIONS

Japanese Office Action issued Dec. 3, 2024 in Japanese Patent Application No. 2021-545242 (with unedited computer-generated English translation). 5 pages.
Japanese Office Action issued Dec. 3, 2024 in Japanese Patent Application No. 2021-562710 (with unedited computer-generated English translation), 8 pages.
Korean Office Action issued May 16, 2024 in Korean Application No. 10-2022-7020161 with English Computer-generated English translation, 8 pgs.
Extended European Search Report issued on Dec. 15, 2022, in corresponding European Patent Application No. 20897104.4, 7 pages.
International Search report issued Feb. 22, 2021 in PCT/JP2020/044999, filed on Dec. 3, 2020, 4 pages.
Japanese Office Action issued Sep. 10, 2024 in Japanese Patent application No. 2021-562710 (with unedited, machine-generated English translation), 5 pages.
Japanese Office Action issued Dec. 19, 2023 in Japanese Patent Application No. 2021-509289 (with unedited computer-generated English Translation), 5 pages.
Combined Taiwanese Office Action and Search Report issued Nov. 16, 2023 in Taiwanese Patent Application No. 109109879 (with unedited computer-generated English Translation), 23 pages.
Combined Taiwanese Office Action and Search Report issued Dec. 14, 2023 in Taiwanese Patent Application No. 109120050 (with unedited computer-generated English Translation), 23 pages.
Chinese Office Action issued Dec. 29, 2023 in Chinese Patent Application No. 202080083710.9 (with unedited computer-generated English Translation), 10 pages.
Japanese Office Action issued Feb. 6, 2024 in Japanese Patent Application No. 2021-528137 (with unedited computer-generated English Translation), 4 pages.
Combined Chinese Office Action and Search Report issued on Jan. 20, 2023 in Chinese Patent Application No. 202080043402.3 (with English translation), 11 pages.
Korean Office Action issued Jun. 22, 2023 in Korean Patent Application No. 10-2022-7000636 (with English machine translation), 11 pages.
Korean Office Action issued Jun. 27, 2023 in Korean Patent Application No. 10-2021-7022116 (with English machine translation), 8 pages.
Office Action issued Feb. 24, 2022, in corresponding Indian Patent Application No. 202117047346 (with English Translation), 5 pages.
Combined Chinese Office Action and Search Report issued Apr. 24, 2023 in Patent Application No. 202080083710.9 (with English machine translation), 15 pages.
Extended European Search Report issued May 25, 2023 in European Patent Application No. 20825530.7, 6 pages.
Office Action issued Oct. 17, 2023, in corresponding Japanese Patent Application No. 2021-509289 (with English Translation), 5 pages.
Office Action issued Oct. 17, 2023, in corresponding Chinese Patent Application No. 202080043402.3 (with English Translation), 9 pages.
Combined Chinese Office Action and Search Report issued Oct. 9, 2022 in Chinese Patent Application No. 202080012707.8 (with unedited computer generated English translation), 25 pages.
Extended European Search Report issued Oct. 12, 2022 in European Patent Application No. 20862800.8, 7 pages.
Korean Office Action issued Dec. 23, 2024 in Korean Patent Application No. 10-2022-7020161, (with unedited computer-generated English translation), 6 pages.
Chinese Office Action issued Dec. 19, 2023 in Chinese Patent Application No. 202080083710.9 (with unedited computer-generated English Translation), 10 pages.
Korean Office Action issued Apr. 14, 2025 in Korean Patent Application No. 10-2022-7020161 (with unedited computer-generated English translation), 9 pages.

* cited by examiner

POLYMER COMPOSITION PRODUCTION METHOD

TECHNICAL FIELD

The present invention relates to a method of producing a polymer composition.

BACKGROUND ART

In recent years, in association with a global trend to restrict carbon dioxide emissions along with an increase in awareness of environmental issues, there has been a growing demand for a reduction in fuel consumption of an automobile. In order to meet such demand, there is also a requirement for tire performance that rolling resistance be reduced. Hitherto, as a technique for reducing the rolling resistance of a tire, a technique involving optimizing a tire structure has been investigated, but there is also a currently performed general technique involving using, as a polymer composition to be applied to a tire, one having a low tan δ (hereinafter sometimes referred to as "low hysteresis loss property") and being excellent in low heat build-up.

A conceivable method of obtaining such polymer composition having low heat build-up involves, for example, reducing an amount of a filler, such as carbon black or silica, or using carbon black having a large particle diameter. However, any such method inevitably entails reductions in reinforcing property, wear resistance, and grip property on a wet road surface (hereinafter sometimes referred to as "wet grip property") of the polymer composition.

In view of the foregoing, for example, an investigation has been made on use of a modified conjugated diene-based polymer, which is obtained by forming an active polymer having a metal end and modifying the active polymer through introduction of a specific modifier thereinto, as a tread material for a tire (see, for example, Patent Literature 1). In Patent Literature 1, there is a disclosure that this material, when used as a tread material for a tire, provides a product excellent in heat build-up, wear resistance, and wet grip property.

CITATION LIST

Patent Literature

PTL 1: JP 2016-528369 A

SUMMARY OF INVENTION

Technical Problem

However, when the modified conjugated diene-based polymer disclosed in Patent Literature 1 is used as a tread material for a tire, its strong interaction with a filler such as silica contained in a polymer composition leads to poor processability, and hence kneading cannot be sufficiently performed, resulting in a failure to exhibit performance in some cases.

In view of the foregoing, some aspects according to the invention provide a method of producing a polymer composition that has satisfactory processability, and when containing a filler, has satisfactory dispersibility of the filler, and that is suited for the production of a crosslinked polymer (tire) excellent in low hysteresis loss property.

Solution to Problem

The invention has been made in order to solve at least part of the above-mentioned problems, and can be realized as the following aspects.

According to one aspect of the invention, there is provided a method of producing a polymer composition, including:
  a first step of kneading (A) a conjugated diene-based polymer that is a polymer of a conjugated diene compound or a copolymer of a conjugated diene compound and an aromatic vinyl compound, and is a reaction product of an active polymerization end and a compound represented by any one of the following general formulae (1) to (3), and (B) a basic compound having an acid dissociation constant of 8.0 or more; and
  a second step of kneading a kneaded product obtained in the first step and a crosslinking agent:

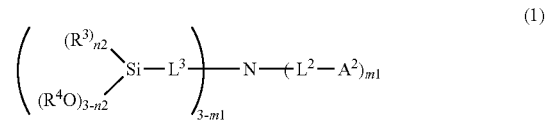

in the formula (1), $A^2$ represents a monovalent group bonded to $L^2$ via an imino group, an amide group, a (thio)carbonyl group, a (thio)carbonyloxy group, a sulfide, or a polysulfide, or represents a protected primary amino group, a protected secondary amino group, a tertiary amino group, a nitrile group, a pyridyl group, a (thio)epoxy group, a (thio)isocyanate group, a (thio)formyl group, a (thio)carboxylic acid ester, a metal salt of a (thio)carboxylic acid ester, a carboxylic halide, an imidazolyl group, a group represented by the following formula (1a), or a group represented by the following formula (1b), $L^2$ and $L^3$ each independently represent a single bond or a hydrocarbylene group having 1 to 20 carbon atoms, $R^3$ and $R^4$ each independently represent a hydrocarbyl group having 1 to 4 carbon atoms, n2 represents from 0 to 3, and m1 represents 0 or 1;

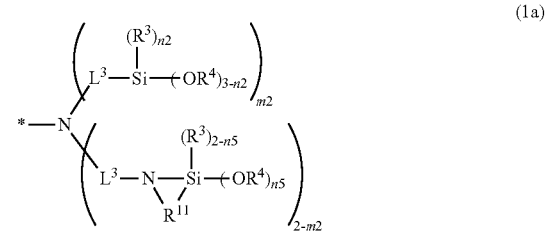

in the formula (1a), $L^3$, $R^3$, $R^4$, and n2 are the same as in the formula (1), n5 represents 1 or 2, m2 represents from 0 to 2, $R^{11}$ represents an alkanediyl group having 1 to 20 carbon atoms, a plurality of $L^3$s may be identical to or different from each other, and "*" represents a site to be bonded to $L^2$;

in the formula (1b), $R^3$ and $R^4$ are the same as in the formula (1), n5 and $R^{11}$ are the same as in the formula (1a), and "*" represents a site to be bonded to $L^2$;

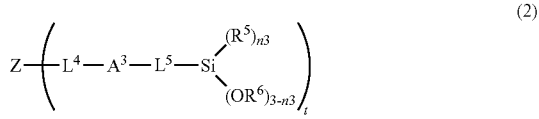

(2)

in the formula (2), $A^3$s each independently represent an imino group, an amide group, a (thio)carbonyl group, a (thio)carbonyloxy group, a secondary amino group, or a tertiary amino group, Z represents a nitrogen atom-containing or -free t-valent group having 1 to 20 carbon atoms, $L^4$ represents a single bond or a hydrocarbylene group having 1 to 20 carbon atoms, $L^5$ represents a hydrocarbylene group having 1 to 20 carbon atoms, $R^5$ and $R^6$ each independently represent a hydrocarbyl group having 1 to 4 carbon atoms, n3 represents 0 or 1, and "t" represents 2 or 3; and

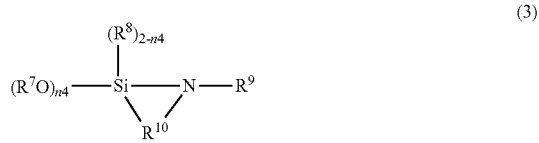

(3)

in the formula (3), $R^7$ and $R^8$ each independently represent a hydrocarbyl group having 1 to 20 carbon atoms, $R^9$ represents a hydrocarbyl group having 1 to 20 carbon atoms, or a substituted alkyl group having 1 to 20 carbon atoms, at least one of a hydrogen atom or —$CH_2$— of the alkyl group being substituted with a group containing at least one kind of element selected from the group consisting of: silicon; nitrogen; phosphorus; oxygen; and sulfur, or represents an aromatic group having 6 to 20 carbon atoms, the aromatic group containing at least one kind of element selected from the group consisting of: nitrogen; phosphorus; oxygen; and sulfur, $R^{10}$ represents an alkanediyl group having 1 to 20 carbon atoms, and n4 represents 1 or 2.

In the above aspect of the method of producing a polymer composition, the basic compound having an acid dissociation constant of 8.0 or more may be an amine compound.

In any of the above aspects of the method of producing a polymer composition, the basic compound having an acid dissociation constant of 8.0 or more may be a guanidine-based compound.

In any of the above aspects of the method of producing a polymer composition, the second step may include kneading an acidic compound together with the kneaded product and the crosslinking agent.

In any of the above aspects of the method of producing a polymer composition, the acidic compound may be a saturated fatty acid having 12 to 24 carbon atoms.

In any of the above aspects of the method of producing a polymer composition, the first step may include kneading silica together with the conjugated diene-based polymer and the basic compound having an acid dissociation constant of 8.0 or more.

In any of the above aspects of the method of producing a polymer composition, the first step may include kneading the conjugated diene-based polymer, the basic compound having an acid dissociation constant of 8.0 or more, and the silica, followed by addition of a silane coupling agent and further kneading.

In any of the above aspects of the method of producing a polymer composition, the crosslinking agent may be sulfur.

Advantageous Effects of Invention

According to the method of producing a polymer composition of the invention, the polymer composition, which has satisfactory processability, and when containing a filler, has satisfactory dispersibility of the filler, and which is suited for the production of a crosslinked polymer (tire) excellent in low hysteresis loss property, can be produced.

DESCRIPTION OF EMBODIMENTS

Preferred embodiments of the invention are described in detail below. It should be appreciated that the invention is not limited to the embodiments described below, and includes various modification examples performed within the scope of the invention.

Herein, a numerical range described like "from X to Y" is meant to include a numerical value X as a lower limit value and a numerical value Y as an upper limit value.

Herein, "(meth)acrylate" is a concept comprehending both of "acrylate" and "methacrylate".

1. Method of Producing Polymer Composition

A method of producing a polymer composition according to one embodiment of the invention includes: a first step of kneading (A) a conjugated diene-based polymer that is a polymer of a conjugated diene compound or a copolymer of a conjugated diene compound and an aromatic vinyl compound, and is a reaction product between an active polymerization end and a compound represented by any one of the following general formulae (1) to (3) (hereinafter sometimes referred to as "conjugated diene-based polymer (A)"), and (B) a basic compound having an acid dissociation constant of 8.0 or more (hereinafter sometimes referred to as "basic compound (B)"); and a second step of kneading a kneaded product obtained in the first step and a crosslinking agent.

A polymer composition obtained by the production method according to this embodiment is an unvulcanized polymer composition obtained by kneading the conjugated diene-based polymer (A), the basic compound (B), and as required, other additives. Such polymer composition forms a crosslinked polymer by, for example, being subjected to crosslinking treatment such as vulcanization.

The method of producing a polymer composition according to this embodiment is described below.

1.1. First Step

The first step is a step of kneading the conjugated diene-based polymer (A) and the basic compound (B) to provide a kneaded product containing the conjugated diene-based polymer (A) and the basic compound (B). In the first step, the whole or part of the basic compound (B) may be generated by kneading a compound for generating the basic compound (B) (hereinafter sometimes referred to as "compound for generation") together with the conjugated diene-based polymer (A). That is, the whole or part of the basic compound (B) may be generated during the first step.

In addition, in the first step, the conjugated diene-based polymer (A), the basic compound (B), and silica may be kneaded, followed by addition of a silane coupling agent and further kneading. When the basic compound (B) is generated in the first step, silica and a silane coupling agent may be kneaded together with the conjugated diene-based polymer (A) and the compound for generation.

In addition, in the first step, as required, another polymer (polymer other than the conjugated diene-based polymer (A)), an extender oil, an anti-aging agent, and the like may also be kneaded. Further, in the first step, an acidic compound, which is preferably kneaded in the second step, may also be kneaded.

As described above, in the first step, other components may be kneaded together with the conjugated diene-based polymer (A) and the basic compound (B) or the compound for generation, but the basic compound (B) and/or the compound for generation and the conjugated diene-based polymer (A) concurrently start to be kneaded. The other components may start to be kneaded concurrently with the conjugated diene-based polymer (A), or may be added and kneaded after the conjugated diene-based polymer (A) and the basic compound (B) and/or the compound for generation have been kneaded. In the first step, when the basic compound (B) and/or the compound for generation is added and kneaded after the other components, the effects of the invention are not sufficiently obtained in some cases.

In the case of producing a polymer composition containing silica, when the silica is subjected to the first step, the dispersibility of the silica can be made satisfactory from the viewpoint of its balance with a low hysteresis loss property in the crosslinked polymer to be formed from the polymer composition to be obtained.

In addition, when a silane coupling agent is subjected to the first step, it is preferred that the conjugated diene-based polymer (A), the basic compound (B), and silica be kneaded first, followed by addition of the silane coupling agent and further kneading.

Specifically, it is preferred that the conjugated diene-based polymer (A), the basic compound (B), and the components (specifically, silica and the like) other than the silane coupling agent among the components to be subjected to the first step as required be kneaded first, and then the silane coupling agent be added (post-added) to the kneaded product, followed by further kneading.

When the silane coupling agent is post-added in the first step, the polymer composition to be obtained becomes more excellent in processability, and the crosslinked polymer to be formed from the polymer composition has a more excellent low hysteresis loss property. In addition, the dispersibility of the silica can be made more satisfactory.

When the silane coupling agent is post-added, the addition timing of the silane coupling agent is appropriately decided in accordance with, for example, the kind of the silica, the use ratio of the silica, and kneading conditions, in consideration of, for example, the kind and use ratio of the conjugated diene-based polymer (A), and the use ratio of the basic compound (B) and/or the compound for generation.

In addition, when the silane coupling agent is post-added, it is preferred that at least the conjugated diene-based polymer (A), the basic compound (B) and/or the compound for generation, and the silica be blended and kneaded over from 0.5 minute to 10 minutes, and then the silane coupling agent be added and blended therein and kneaded therewith over from 0.5 minute to 10 minutes.

As a kneading machine to be used in the first step, there is given an open or closed kneading machine, such as Plastomill, a Banbury mixer, a roll, or an internal mixer.

In addition, in the first step, a kneading temperature is set to from 30° C. to 180° C., preferably from 50° C. to 160° C. When the kneading temperature in the first step is 160° C. or more, there is a risk in that the processability of the polymer composition to be obtained may be degraded.

In addition, the case of subjecting the silane coupling agent to the first step is not limited to the technique involving post-adding and kneading the silane coupling agent, and a kneaded product containing the silane coupling agent may be obtained by a technique involving simultaneously kneading the silane coupling agent together with all the other components to be subjected to the first step.

Each component to be used in the first step is described in detail below.

1.1.1. Conjugated Diene-Based Polymer (A)

The conjugated diene-based polymer (A) is a polymer of a conjugated diene compound or a copolymer of a conjugated diene compound and an aromatic vinyl compound, and is a reaction product between an active polymerization end and a compound represented by any one of the following general formulae (1) to (3):

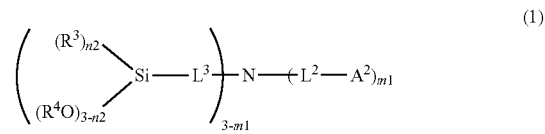

in the formula (1), $A^2$ represents a monovalent group bonded to $L^2$ via an imino group, an amide group, a (thio)carbonyl group, a (thio)carbonyloxy group, a sulfide, or a polysulfide, or represents a protected primary amino group, a protected secondary amino group, a tertiary amino group, a nitrile group, a pyridyl group, a (thio)epoxy group, a (thio)isocyanate group, a (thio)formyl group, a (thio)carboxylic acid ester, a metal salt of a (thio)carboxylic acid ester, a carboxylic halide, an imidazolyl group, a group represented by the following formula (1a), or a group represented by the following formula (1b), $L^2$ and $L^3$ each independently represent a single bond or a hydrocarbylene group having 1 to 20 carbon atoms, $R^3$ and $R^4$ each independently represent a hydrocarbyl group having 1 to 4 carbon atoms, n2 represents from 0 to 3, and m1 represents 0 or 1;

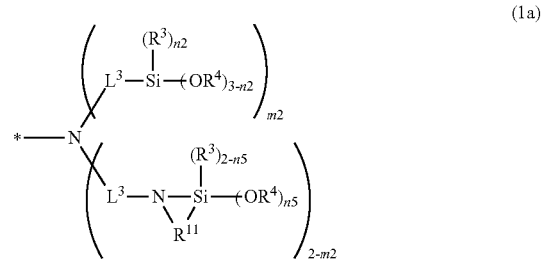

in the formula (1a), $L^3$, $R^3$, $R^4$, and n2 are the same as in the formula (1), n5 represents 1 or 2, m2 represents from 0 to 2, $R^{11}$ represents an alkanediyl group having 1 to 20 carbon atoms, a plurality of $L^3$s may be identical to or different from each other, and "*" represents a site to be bonded to $L^2$;

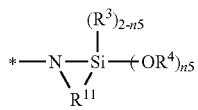
(1b)

in the formula (1b), $R^3$ and $R^4$ are the same as in the formula (1), n5 and $R^{11}$ are the same as in the formula (1a), and "*" represents a site to be bonded to $L^2$;

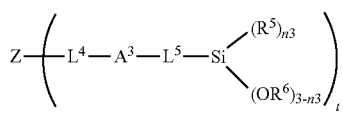
(2)

in the formula (2), $A^3$s each independently represent an imino group, an amide group, a (thio)carbonyl group, a (thio)carbonyloxy group, a secondary amino group, or a tertiary amino group, Z represents a nitrogen atom-containing or -free t-valent group having 1 to 20 carbon atoms, $L^4$ represents a single bond or a hydrocarbylene group having 1 to 20 carbon atoms, $L^5$ represents a hydrocarbylene group having 1 to 20 carbon atoms, $R^5$ and $R^6$ each independently represent a hydrocarbyl group having 1 to 4 carbon atoms, n3 represents 0 or 1, and "t" represents 2 or 3; and

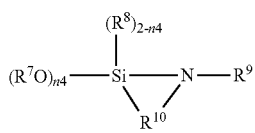
(3)

in the formula (3), $R^7$ and $R^8$ each independently represent a hydrocarbyl group having 1 to 20 carbon atoms, $R^9$ represents a hydrocarbyl group having 1 to 20 carbon atoms, or a substituted alkyl group having 1 to 20 carbon atoms, at least one of a hydrogen atom or —$CH_2$— of the alkyl group being substituted with a group containing at least one kind of element selected from the group consisting of: silicon; nitrogen; phosphorus; oxygen; and sulfur, or represents an aromatic group having 6 to 20 carbon atoms, the aromatic group containing at least one kind of element selected from the group consisting of: nitrogen; phosphorus; oxygen; and sulfur, $R^{10}$ represents an alkanediyl group having 1 to 20 carbon atoms, and n4 represents 1 or 2.

The conjugated diene-based polymer (A) has a structural unit derived from the conjugated diene compound, and has a structure derived from the compound represented by any one of the general formulae (1) to (3) at the active polymerization end thereof. Such conjugated diene-based polymer (A) may be obtained by first polymerizing monomers including the conjugated diene compound in the presence of an alkali metal compound or an alkaline earth metal compound to provide a polymer having an active polymerization end (polymerization step), and then allowing the polymer having an active polymerization end to react with the compound represented by any one of the general formulae (1) to (3) (hereinafter sometimes referred to as "specific modifier") (modification step).

<Polymerization Step>

Examples of the conjugated diene compound that may be used in the polymerization include 1,3-butadiene, isoprene, 2,3-dimethyl-1,3-butadiene, 1,3-pentadiene, 1,3-hexadiene, 1,3-heptadiene, 2-phenyl-1,3-butadiene, 3-methyl-1,3-pentadiene, and 2-chloro-1,3-butadiene. Of those, 1,3-butadiene, isoprene, and 2,3-dimethyl-1,3-butadiene are preferred. The conjugated diene compounds may be used alone or in combination thereof.

The conjugated diene-based polymer (A) may be a homopolymer of the conjugated diene compound, but from the viewpoint of enhancing the strength of the crosslinked polymer, is preferably a copolymer of the conjugated diene compound and the aromatic vinyl compound. In particular, a copolymer including 1,3-butadiene and styrene in its monomer composition is preferred because of a high living property in anionic polymerization. When the conjugated diene-based polymer (A) is a copolymer of the conjugated diene compound and the aromatic vinyl compound, the conjugated diene-based polymer (A) typically has a random copolymerization moiety in which the conjugated diene compound and the aromatic vinyl compound are irregularly distributed, and may further have a block moiety formed of a structural unit derived from the conjugated diene compound or the aromatic vinyl compound.

Examples of the aromatic vinyl compound that may be used in the polymerization include styrene, 2-methylstyrene, 3-methyl styrene, 4-methylstyrene, α-methylstyrene, 2,4-dimethyl styrene, 2,4-diisopropylstyrene, 5-tert-butyl-2-methylstyrene, vinylethylbenzene, divinylbenzene, trivinylbenzene, divinylnaphthalene, tert-butoxy styrene, vinylbenzyldimethylamine, (4-vinylbenzyl)dimethylaminoethyl ether, N,N-dimethylaminoethylstyrene, N,N-dim ethylaminomethyl styrene, 2-ethyl styrene, 3-ethyl styrene, 4-ethyl styrene, 2-tert-butyl styrene, 3-tert-butyl styrene, 4-tert-butyl styrene, vinylxylene, vinylnaphthalene, vinylpyridine, diphenylethylene, and a tertiary amino group-containing diphenylethylene (e.g., 1-(4-N,N-dimethylaminophenyl)-1-phenyl ethylene). Of those, styrene and α-methylstyrene are preferred. The aromatic vinyl compounds may be used alone or in combination thereof.

When the conjugated diene-based polymer (A) is a copolymer of the conjugated diene compound and the aromatic vinyl compound, the content of the aromatic vinyl compound (aromatic vinyl content) is set to preferably from 3 mass % to 55 mass %, more preferably from 5 mass % to 50 mass % in 100 mass % in total of the conjugated diene compound and the aromatic vinyl compound to be used for the polymerization from the viewpoint of achieving a satisfactory balance between the low hysteresis loss property and the wet grip property of the crosslinked polymer to be obtained. The aromatic vinyl content of the conjugated diene-based polymer (A) may be measured by $^1$H-NMR.

In the polymerization, a monomer other than the conjugated diene compound and the aromatic vinyl compound may be used. Examples of the other monomer include acrylonitrile, methyl (meth)acrylate, ethyl (meth)acrylate, and hydroxyethyl (meth)acrylate. The use amount of the other monomer is set to preferably 25 mass % or less, more preferably 15 mass % or less, particularly preferably 10 mass % or less in 100 mass % of the total amount of the monomers to be used for the polymerization.

As a polymerization method to be used, any of a solution polymerization method, a vapor phase polymerization method, and a bulk polymerization method may be used, but the solution polymerization method is particularly preferred. In addition, any of a batch system and a continuous system may be used as a mode of polymerization. When the solution polymerization method is used, a specific example of the polymerization method is a method involving polymerizing monomers including the conjugated diene compound in an organic solvent in the presence of a polymerization initiator and a randomizer that is to be used as required.

An alkali metal compound or an alkaline earth metal compound may be used as the polymerization initiator. Specific examples thereof include alkyllithiums, such as methyllithium, ethyllithium, n-propyllithium, n-butyllithium, sec-butyllithium, and tert-butyllithium, 1,4-dilithiobutane, phenyllithium, stilbenelithium, naphthyllithium, 1,3-bis(1-lithio-1,3-dimethylpentyl)benzene, 1,3-phenylenebis(3-methyl-1-phenylpentylidene)dilithium, 3-(dimethylamino)propyllithium, naphthyl sodium, naphthylpotassium, di-n-butylmagnesium, di-n-hexylmagnesium, ethoxypotassium, and calcium stearate. Of those, a lithium compound is preferred. The total use amount of the polymerization initiator is preferably set to from 0.2 mmol to 20 mmol with respect to 100 g of the monomers to be used for the polymerization. The polymerization initiators may be used alone or in combination thereof.

In addition, the polymerization reaction may be performed in the presence of a compound (hereinafter sometimes referred to as "modifying initiator") obtained by mixing the alkali metal compound or the alkaline earth metal compound with a compound having a functional group having an interaction with silica. When the polymerization is performed in the presence of the modifying initiator, the functional group having an interaction with silica can be introduced into the polymerization initiation end of the conjugated diene-based polymer (A). Herein, the "interaction" means the formation of a covalent bond between molecules, or the formation of an intermolecular force weaker than a covalent bond (e.g., an electromagnetic force acting between molecules, such as an ion-dipole interaction, a dipole-dipole interaction, a hydrogen bond, or a van der Waals force). The "functional group having an interaction with silica" preferably has at least one kind selected from the group consisting of: a nitrogen atom; a sulfur atom; a phosphorus atom; and an oxygen atom.

The modifying initiator is preferably a reaction product between a lithium compound such as an alkyllithium, and a nitrogen-containing compound such as a secondary amine compound. Specific examples of the nitrogen-containing compound include dimethylamine, diethylamine, dipropylamine, dibutylamine, dodecamethyleneimine, N,N'-dimethyl-N'-trimethylsilyl-1,6-diaminohexane, piperidine, pyrrolidine, hexamethyleneimine, heptamethyleneimine, dicyclohexylamine, N-methylbenzylamine, di-(2-ethylhexyl)amine, diallyl amine, morpholine, N-(trimethylsilyl) piperazine, N-(tert-butyldimethylsilyl)piperazine, and 1,3-ditrimethylsilyl-1,3,5-triazinane. When the polymerization is performed in the presence of the modifying initiator, the polymerization may be performed as follows: the alkali metal compound or the alkaline earth metal compound, and the compound having a functional group having an interaction with silica are mixed with each other in advance to prepare the modifying initiator, and the prepared modifying initiator is added into the polymerization system. Alternatively, the polymerization may be performed as follows: the alkali metal compound or the alkaline earth metal compound, and the compound having a functional group having an interaction with silica are added into the polymerization system, and are mixed with each other in the polymerization system to prepare the modifying initiator. Alternatively, a nitrogen-containing alkyllithium compound may be used. As a specific example of the nitrogen-containing alkyllithium compound, for example, a reaction product between 3-dimethylaminopropyllithium and isoprene may be used.

The randomizer may be used for the purpose of, for example, adjusting a vinyl bond content, which represents the content ratio of vinyl bonds (1,2-bond and 3,4-bond) in the polymer. Examples of the randomizer include dimethoxybenzene, tetrahydrofuran, dimethoxyethane, diethylene glycol dibutyl ether, diethylene glycol dimethyl ether, 2,2-di(tetrahydrofuryl)propane, 2-(2-ethoxyethoxy)-2-methylpropane, triethylamine, pyridine, N-methylmorpholine, and tetramethylethylenediamine. Those randomizers may be used alone or in combination thereof.

The organic solvent to be used for the polymerization only needs to be an organic solvent inert to the reaction, and for example, an aliphatic hydrocarbon, an alicyclic hydrocarbon, or an aromatic hydrocarbon may be used. Of those, a hydrocarbon having 3 to 8 carbon atoms is preferred, and specific examples thereof include propane, n-butane, isobutane, n-pentane, isopentane, n-hexane, cyclohexane, propene, 1-butene, isobutene, trans-2-butene, cis-2-butene, 1-pentyne, 2-pentyne, 1-hexene, 2-hexene, benzene, toluene, xylene, ethylbenzene, heptane, cyclopentane, methylcyclopentane, methylcyclohexane, 1-pentene, 2-pentene, and cyclohexene. The organic solvents may be used alone or in combination thereof.

When solution polymerization is used, the concentration of the monomers in the reaction solvent is preferably from 5 mass % to 50 mass %, more preferably from 10 mass % to 30 mass % from the viewpoint of maintaining a balance between productivity and ease of polymerization control. The temperature of the polymerization reaction is preferably from −20° C. to 150° C., more preferably from 0° C. to 120° C., particularly preferably from 20° C. to 100° C. In addition, the polymerization reaction is preferably performed under a pressure sufficient for keeping the monomers substantially in a liquid phase. Such pressure may be obtained by a method involving, for example, pressurizing the inside of a reactor with a gas inert to the polymerization reaction. Through such polymerization reaction, a conjugated diene-based polymer having an active polymerization end may be obtained.

In the conjugated diene-based polymer having an active polymerization end, the vinyl bond content in the structural unit derived from the conjugated diene compound is preferably from 30 mol % to 65 mol %, more preferably from 33 mol % to 62 mol %, particularly preferably from 35 mol % to 60 mol %. When the vinyl bond content is less than 30 mol %, the grip characteristic tends to be excessively low, and when the vinyl bond content is more than 65 mol %, the wear resistance of the crosslinked polymer to be obtained tends to be degraded. Herein, the "vinyl bond content" is a value indicating the content ratio of a structural unit having a vinyl bond to all structural units derived from the conjugated diene compound in the conjugated diene-based polymer, and is a value measured by $^1$H-NMR.

<Modification Step>

Next, the conjugated diene-based polymer obtained by the above-mentioned polymerization reaction is subjected to a reaction between the active polymerization end of the polymer and the compound represented by any one of the following general formulae (1) to (3) (specific modifier). Through such step, the conjugated diene-based polymer (A) having an end modified with the specific modifier may be obtained. Such conjugated diene-based polymer (A) having an end modified with the specific modifier has an increased interaction with a filler at the end modification site, and hence improves the wet grip property and the low hysteresis loss property, and also improves processability and dispersibility of the filler by virtue of the branching characteristic of an imine.

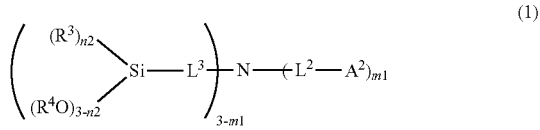

In the formula (1), $A^2$ represents a monovalent group bonded to $L^2$ via an imino group, an amide group, a (thio)carbonyl group, a (thio)carbonyloxy group, a sulfide, or a polysulfide, or represents a protected primary amino group, a protected secondary amino group, a tertiary amino group, a nitrile group, a pyridyl group, a (thio)epoxy group, a (thio)isocyanate group, a (thio)formyl group, a (thio)carboxylic acid ester, a metal salt of a (thio)carboxylic acid ester, a carboxylic halide, an imidazolyl group, a group represented by the following formula (1a), or a group represented by the following formula (1b), $L^2$ and $L^3$ each independently represent a single bond or a hydrocarbylene group having 1 to 20 carbon atoms, $R^3$ and $R^4$ each independently represent a hydrocarbyl group having 1 to 4 carbon atoms, n2 represents from 0 to 3, and m1 represents 0 or 1.

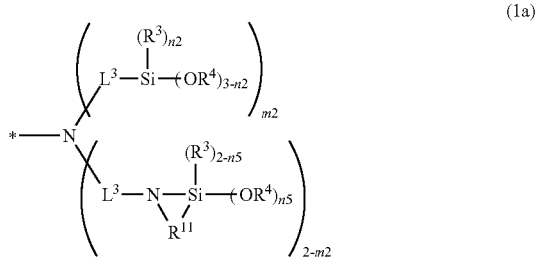

In the formula (1a), $L^3$, $R^3$, $R^4$, and n2 are the same as in the formula (1), n5 represents 1 or 2, m2 represents from 0 to 2, and $R^{11}$ represents an alkanediyl group having 1 to 20 carbon atoms. A plurality of $L^3$s may be identical to or different from each other. "*" represents a site to be bonded to $L^2$.

In the formula (1b), $R^3$ and $R^4$ are the same as in the formula (1), and n5 and $R^{11}$ are the same as in the formula (1a). "*" represents a site to be bonded to $L^2$.

In the formula (1), examples of the hydrocarbylene group having 1 to 20 carbon atoms represented by any one of $L^2$ and $L^3$ include a linear or branched alkanediyl group having 1 to 20 carbon atoms, a cycloalkylene group having 3 to 20 carbon atoms, and an arylene group having 6 to 20 carbon atoms. In the formula (1), examples of the hydrocarbyl group having 1 to 4 carbon atoms represented by any one of $R^3$ and $R^4$ include a linear or branched alkyl group having 1 to 4 carbon atoms, and a cycloalkyl group having 3 or 4 carbon atoms.

Specific examples of the compound represented by the general formula (1) include N-(3-imidazolylpropyl)-N,N-bis(3-trimethoxysilylpropyl)amine, N-(3-imidazolylpropyl)-N,N-bis(3-triethoxysilylpropyl)amine, N,N-bis(trimethoxysilyl)aminopropylmethyldiethylsilane, N,N,N-tris(triethoxysilylpropyl)amine, N,N,N',N'-tetrakis(3-triethoxysilylpropyl)-1,3-diaminopropane, N-(3-(2,2-diethoxy-1,2-azasilolidin-1-yl)propyl)-N,N',N'-tris(3-(triethoxysilyl)propyl)propane-1,3-diamine, N,N-bis(3-(2,2-diethoxy-1,2-azasilolidin-1-yl)propyl)-N',N'-bis(3-(triethoxysilyl)propyl )propane-1,3-diamine, and 3-(2,2-diethoxy-1,2-azasilolidin-1-yl)-N,N-bis(3-(triethoxysilyl)propyl)propan-1-amine.

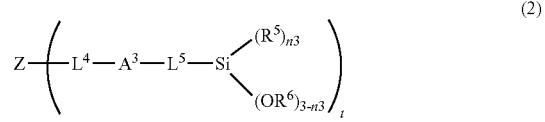

In the formula (2), $A^3$s each independently represent an imino group, an amide group, a (thio)carbonyl group, a (thio)carbonyloxy group, a secondary amino group, or a tertiary amino group, Z represents a nitrogen atom-containing or -free t-valent group having 1 to 20 carbon atoms, $L^4$ represents a single bond or a hydrocarbylene group having 1 to 20 carbon atoms, $L^5$ represents a hydrocarbylene group having 1 to 20 carbon atoms, $R^5$ and $R^6$ each independently represent a hydrocarbyl group having 1 to 4 carbon atoms, n3 represents 0 or 1, and "t" represents 2 or 3.

In the formula (2), Z represents a divalent or trivalent group having 1 to 20 carbon atoms, which may contain a nitrogen atom, and preferably contains a nitrogen atom. In the formula (2), examples of the hydrocarbylene group having 1 to 20 carbon atoms represented by $L^4$ and the hydrocarbylene group having 1 to 20 carbon atoms represented by $L^5$ include a linear or branched alkanediyl group having 1 to 20 carbon atoms, a cycloalkylene group having 3 to 20 carbon atoms, and an arylene group having 6 to 20 carbon atoms. In the formula (2), examples of the hydrocarbyl group having 1 to 4 carbon atoms represented by any one of $R^5$ and $R^6$ include a linear or branched alkyl group having 1 to 4 carbon atoms, and a cycloalkyl group having 3 or 4 carbon atoms.

Specific examples of the compound represented by the general formula (2) include compounds represented by the following formulae (M-1) to (M-4).

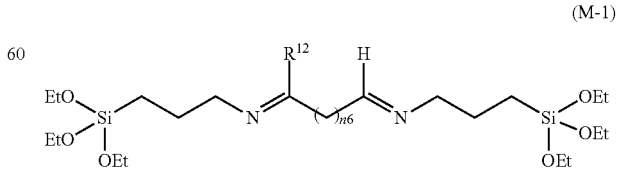

-continued

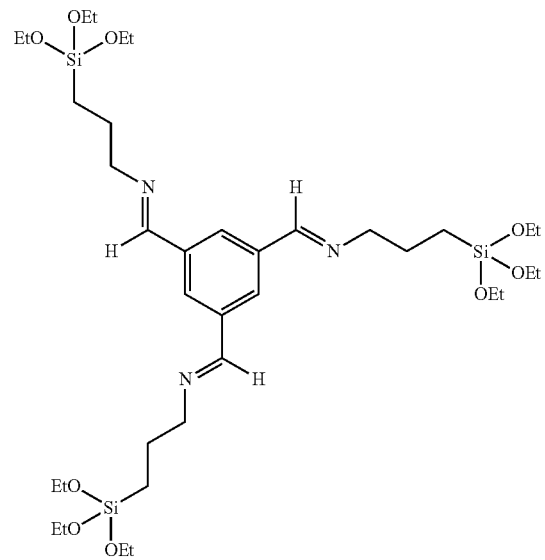
(M-2)

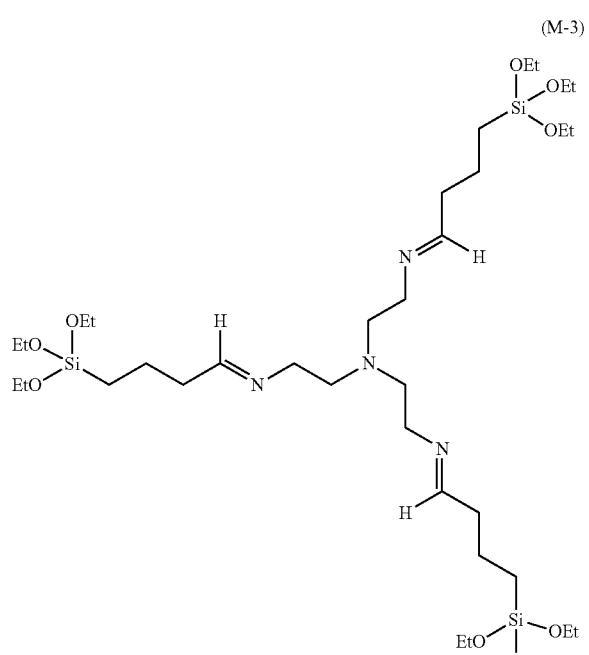
(M-3)

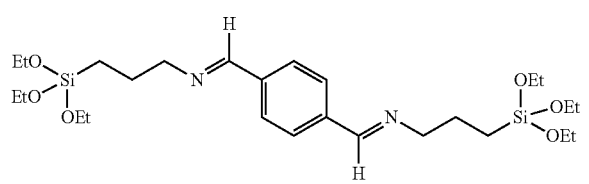
(M-4)

In the formula (M-1), $R^{12}$ represents a hydrogen atom or an alkyl group having 1 to 20 carbon atoms, and n6 represents an integer of from 1 to 10.

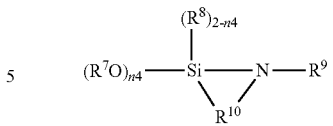
(3)

In the formula (3), $R^7$ and $R^8$ each independently represent a hydrocarbyl group having 1 to 20 carbon atoms, $R^9$ represents a hydrocarbyl group having 1 to 20 carbon atoms, or a substituted alkyl group having 1 to 20 carbon atoms, at least one of a hydrogen atom or —CH$_2$— of the alkyl group being substituted with a group containing at least one kind of element selected from the group consisting of: silicon; nitrogen; phosphorus; oxygen; and sulfur, or represents an aromatic group having 6 to 20 carbon atoms, the aromatic group containing at least one kind of element selected from the group consisting of: nitrogen; phosphorus; oxygen; and sulfur, $R^{10}$ represents an alkanediyl group having 1 to 20 carbon atoms, and n4 represents 1 or 2.

In the formula (3), examples of the hydrocarbyl group having 1 to 20 carbon atoms represented by any one of $R^7$ and $R^8$ include a linear or branched alkyl group having 1 to 20 carbon atoms, a cycloalkyl group having 3 to 20 carbon atoms, and an aryl group having 6 to 20 carbon atoms.

Specific examples of the compound represented by the general formula (3) include N-phenyl-2,2-dimethoxy-1-aza-2-silacyclopentane, N-(3-trimethoxysilylpropyl)-2,2-dimethoxy-1-aza-2-silacyclopentane, and N-(3-triethoxysilylpropyl)-2,2-dimethoxy-1-aza-2-silacyclopentane.

In the modification reaction of the conjugated diene-based polymer having an active polymerization end, the specific modifier may be used alone, but a modifier other than the specific modifier (hereinafter sometimes referred to as "other modifier") may be used together with the specific modifier. The other modifier is not particularly limited as long as the other modifier is a compound having a functional group having an interaction with a filler, and being capable of reacting with the active polymerization end of the polymer.

The above-mentioned modification reaction may be performed, for example, as a solution reaction. The solution reaction may be performed using a solution containing an unreacted monomer after the termination of the polymerization reaction, or may be performed after the conjugated diene-based polymer contained in the solution has been isolated and dissolved in an appropriate solvent such as cyclohexane. In addition, the modification reaction may be performed using any of a batch system and a continuous system. In this case, a method of adding the modifier is not particularly limited, and examples thereof include a method involving adding the modifier in one portion, a method involving adding the modifier in divided portions, and a method involving continuously adding the modifier.

The use ratio of the specific modifier (when two or more kinds thereof are used, their total amount) is set to preferably 0.2 mol or more, more preferably 0.4 mol or more with respect to 1 mol of a metal atom to be involved in the polymerization reaction that the polymerization initiator has. When the use ratio is set to 0.2 mol or more, the modification reaction of the polymer end with the specific modifier can be caused to proceed sufficiently, and hence the interaction with a filler at the end modification site can be made sufficiently strong. In addition, in order to reduce the amount of unreacted substances in the solution after the modification reaction, the upper limit value of the use ratio of the specific modifier is set to preferably less than 1.5 mol, more preferably less than 1.2 mol with respect to 1 mol of the metal atom to be involved in the polymerization reaction that the polymerization initiator has.

When the specific modifier and the other modifier are used in combination in the modification reaction, the use ratio of the other modifier is set to preferably 30 mol % or less, more preferably 20 mol % or less, particularly preferably 10 mol % or less with respect to the total use ratio of the specific modifier and the other modifier from the viewpoint of causing the reaction between the conjugated diene-based polymer and the specific modifier to proceed sufficiently.

The temperature of the modification reaction is generally the same as the temperature of the polymerization reaction, and is set to preferably from −20° C. to 150° C., more preferably from 0° C. to 120° C., particularly preferably from 20° C. to 100° C. When the temperature of the modification reaction is low, the viscosity of the conjugated diene-based polymer after the modification tends to be increased. Meanwhile, when the temperature of the modification reaction is high, the active end of the polymer is liable to be deactivated. The reaction time of the modification reaction is preferably from 1 minute to 5 hours, more preferably from 2 minutes to 1 hour.

The isolation of the conjugated diene-based polymer (A) contained in the reaction solution may be performed by, for example, a known solvent removal method such as steam stripping, and a drying operation such as heat treatment. The Mooney viscosity of the obtained conjugated diene-based polymer (A) may be adjusted by adding an extender oil or the like as required. This treatment can make the processability satisfactory. Examples of the extender oil include an aromatic oil, a naphthenic oil, and a paraffin oil. The blending amount of the extender oil only needs to be appropriately set in accordance with, for example, the monomers to be used for the polymerization, but is, for example, from 10 parts by mass to 50 parts by mass with respect to 100 parts by mass of the conjugated diene-based polymer.

Thus, the conjugated diene-based polymer (A) may be obtained. The conjugated diene-based polymer (A) can improve compatibility with a filler, and can provide a polymer composition improved in processability and dispersibility of the filler. The polymer composition containing such conjugated diene-based polymer (A) can be used to provide a tire (crosslinked polymer) that is excellent in low hysteresis loss property and wet grip property, which are required in an application such as an automobile tire.

The conjugated diene-based polymer (A) preferably has a structure derived from the compound represented by any one of the general formulae (1) to (3) at at least one end of the polymer. The conjugated diene-based polymer (A) having such structure is preferred because, in the case of, for example, application to a tire application, the dispersibility of a filler, such as carbon black or silica, is further improved, and higher improving effects are exhibited on the low hysteresis loss property and the wet grip property.

The weight average molecular weight (Mw) of the conjugated diene-based polymer (A) in terms of polystyrene measured by gel permeation chromatography (GPC) is preferably from 100,000 to 2,000,000. When the Mw is less than 100,000, the crosslinked polymer of the polymer composition to be obtained tends to be reduced in low hysteresis loss property and wear resistance, and when the Mw is more than 2,000,000, the processability of the polymer composition tends to be reduced. The weight average molecular weight (Mw) of the conjugated diene-based polymer (A) to be obtained is more preferably from 150,000 to 1,500,000, still more preferably from 200,000 to 1,000,000.

The molecular weight distribution of the conjugated diene-based polymer (A), that is, the ratio between its weight average molecular weight (Mw) and number average molecular weight (Mn) (Mw/Mn) is preferably from 1.5 to 3.0, more preferably from 1.5 to 2.5, particularly preferably from 1.5 to 2.2. When the molecular weight distribution of the conjugated diene-based polymer (A) falls within the above-mentioned ranges, more excellent low hysteresis loss property, wear resistance, wet grip performance, and mechanical characteristics are likely obtained.

1.1.2. Basic Compound (B)

The basic compound (B) is a compound having an acid dissociation constant (pKa) of 8.0 or more. When the conjugated diene-based polymer (A) and the basic compound (B) are kneaded together, a kneading time can be shortened. This is conceivably because the presence of the basic compound (B) promotes the loosening of an association state between functional groups of the conjugated diene-based polymer (A). In addition, in the second step to be described later, bonding between the conjugated diene-based polymer (A) and the crosslinking agent can be easily promoted.

An amine compound is suitably used as the basic compound (B). Specific examples of such amine compound include pyrrole (pKa=23.0), indole (pKa=21.0), carbazole (pKa=19.9), pyrazole (pKa=19.8), imidazole (pKa=14.4), guanidine (pKa=13.7), 1,1,3,3-tetramethylguanidine (pKa=13.6), piperidine (pKa=11.2), quinuclidine (pKa=11.0), cyclohexylamine (pKa=10.6), 1,3-diphenylguanidine (pKa=10.1), piperazine (pKa=9.8), 1,2,3-triazole (pKa=9.3), purine (pKa=8.9), triethylenediamine (pKa=8.8), morpholine (pKa=8.4), and derivatives thereof. Of those amine compounds, a guanidine-based compound, such as guanidine, 1,3-diphenylguanidine, or 1,1,3,3-tetramethylguanidine, is suitably used from the viewpoint that bonding between the conjugated diene-based polymer (A) and the crosslinking agent is easily promoted.

In addition, an aliphatic amine compound having a long-chain alkyl group or a long-chain alkenyl group is also suitably used as the basic compound (B). Examples of the aliphatic amine compound having a long-chain alkyl group or a long-chain alkenyl group include compounds each having a chemical structure represented by $R^1$—$N(CH_3)_2$, or $R^1$—$NH(CH_2)_xNH_2$ ($R^1$ represents an alkyl group having 10 or more and 24 or less carbon atoms or an alkenyl group having 10 or more and 24 or less carbon atoms, and "x" represents an integer of 1 or more and 5 or less), and acetic acid salts thereof. Specific examples thereof include 1-aminoundecane, stearylamine, dimethylstearylamine, laurylamine, dimethyllaurylamine, oleylamine, dimethyloctylamine, tallow propylenediamine, stearylamine acetate, and acetic acid salts thereof. Those aliphatic amine compounds each having a long-chain alkyl group or a long-chain alkenyl group may be used alone or in combination thereof. Of those, stearylamine (pKa=10.6) is preferred from the viewpoints of raw material availability and handleability.

The basic compound (B) may be generated in the first step by kneading a plurality of compounds, specifically a plurality of compounds for generating the basic compound (compounds for generation) together with the conjugated diene-based polymer (A). In this case, in the first step, the whole of the basic compound (B) to be subjected to the first step may be generated from the plurality of compounds for generation, or part thereof may be generated from the plurality of compounds for generation.

A combination of a sulfenamide-based compound and a thiazole-based compound is suitably used as the plurality of compounds for generation. When the sulfenamide-based compound and the thiazole-based compound are added as the plurality of compounds for generation to a composition containing the conjugated diene-based polymer (A), followed by kneading under predetermined conditions, a disulfide compound and an amine compound are generated. Then, the generated amine compound is kneaded as the basic compound together with the conjugated diene-based polymer (A).

Examples of the sulfenamide-based compound for forming the compound for generation include N-cyclohexyl-2-benzothiazolesulfenamide (CBS), N-(tert-butyl)-2-benzothiazolesulfenamide (TBBS), and N-morpholino-2-benzothiazolesulfenamide (MBS). Those compounds may be used alone or in combination thereof.

In addition, an example of the thiazole-based compound for forming the compound for generation is 2-mercaptobenzothiazole (MBT).

As the combination of the sulfenamide-based compound and the thiazole-based compound, a combination of N-cyclohexyl-2-benzothiazolesulfenamide (CBS) and 2-mercaptobenzothiazolyl (MBT) that generates cyclohexylamine (pKa=10.6) is preferred from the viewpoints of availability and stability of the basic compound to be generated.

The use ratio of the basic compound (B) is preferably from 0.5 part by mass to 10 parts by mass, more preferably from 0.8 part by mass to 8 parts by mass, particularly preferably from 1 part by mass to 5 parts by mass with respect to 100 parts by mass of polymer components. When the use ratio of the basic compound (B) falls within the above-mentioned ranges, sufficient mechanical strength and wear resistance can be imparted to the crosslinked polymer to be formed from the polymer composition to be obtained.

1.1.3. Other Components

In the first step, an optional component may be further added and kneaded as required in addition to the conjugated diene-based polymer (A) and the basic compound (B), which are essential components.

The polymer components may contain another polymer component as an optional component other than the conjugated diene-based polymer (A), which is an essential component. Examples thereof include a natural rubber, a butadiene rubber, a butyl rubber, a synthetic isoprene rubber, a styrene-butadiene copolymer rubber, an ethylene-α-olefin copolymer rubber, an ethylene-α-olefin-diene copolymer rubber, an acrylonitrile-butadiene copolymer rubber, a chloroprene rubber, and a halogenated butyl rubber, and mixtures thereof. Of those, a natural rubber or a butadiene rubber is preferably contained for the reason that the crosslinked polymer (tire) to be obtained can achieve a highly balanced low hysteresis loss property and wet grip property while maintaining wear resistance. The use ratio of the other polymer component is preferably from 10 mass % to 45 mass % in 100 mass % of the polymer components.

Examples of the optional component other than the polymer components include a filler, such as silica or carbon black, a silane coupling agent, an extender oil, and an anti-aging agent.

<Silica>

Examples of the silica include wet silica (hydrous silicic acid), dry silica (silicic anhydride), calcium silicate, and aluminum silicate. Of those, wet silica is preferred.

The use ratio of the silica is preferably from 10 parts by mass to 200 parts by mass, more preferably from 20 parts by mass to 130 parts by mass, particularly preferably from 25 parts by mass to 110 parts by mass with respect to 100 parts by mass of the polymer components. When the content ratio of the silica falls within the above-mentioned ranges, the low hysteresis loss property and the wet grip property of the crosslinked polymer (tire) to be obtained can be highly well balanced.

<Silane Coupling Agent>

Examples of the silane coupling agent include bis(3-triethoxysilylpropyl) tetrasulfide, bis(3-triethoxysilylpropyl) trisulfide, bis(3-triethoxysilylpropyl) disulfide, bis(2-triethoxysilylethyl) tetrasulfide, bis(3-trimethoxysilylpropyl) tetrasulfide, bis(2-trimethoxysilylethyl) tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropylbenzothiazolyl tetrasulfide, 3-triethoxysilylpropylbenzolyl tetrasulfide, 3-triethoxysilylpropyl methacrylate monosulfide, 3-trimethoxysilylpropyl methacrylate monosulfide, bis(3-diethoxymethylsilylpropyl) tetrasulfide, 3-mercaptopropyldimethoxymethylsilane, dimethoxymethylsilylpropyl-N,N-dimethylthiocarbamoyl tetrasulfide, dimethoxymethylsilylpropylbenzothiazolyl tetrasulfide, and 3-octanoylthio-1-propyltriethoxysilane. Those compounds may be used alone or in combination thereof. In addition, of those, from the viewpoint of, for example, an improving effect on a reinforcing property, bis(3-triethoxysilylpropyl) trisulfide, bis(3-triethoxysilylpropyl) disulfide, and 3-trimethoxysilylpropylbenzothiazolyl tetrasulfide are preferred.

The use ratio of the silane coupling agent is preferably from 0.5 part by mass to 20 parts by mass with respect to 100 parts by mass of the silica. When the use ratio of the silane coupling agent falls within the above-mentioned range, a sufficient reinforcing property and fracture resistance characteristic can be imparted to the crosslinked polymer to be formed from the polymer composition, and the wear resistance of the crosslinked polymer can be improved in some cases.

<Carbon Black>

Carbon black that is generally used as a filler may be used as the carbon black. Specific examples of the carbon black include GPF, FEF, HAF, ISAF, and SAF. Of those, ISAF, SAF, or HAF is preferred, and ISAF is more preferred.

The use ratio of the carbon black is preferably from 0.5 part by mass to 100 parts by mass, more preferably from 1 part by mass to 50 parts by mass with respect to 100 parts by mass of the polymer components.

<Extender Oil>

Examples of the extender oil include an aromatic oil, a naphthenic oil, and a paraffin oil. The use ratio of the extender oil is preferably from 0 parts by mass to 50 parts by mass with respect to 100 parts by mass of the polymer components.

<Anti-Aging Agent>

Examples of the anti-aging agent include N-(1,3-dimethylbutyl)-N'-phenyl-p-phenylenediamine and N-phenyl-N'-isopropyl-p-phenylenediamine. The use ratio of the anti-aging agent is preferably from 0.5 part by mass to 5 parts by mass with respect to 100 parts by mass of the polymer components.

1.2. Second Step

The second step is a step including adding at least a crosslinking agent to the kneaded product obtained in the first step, and kneading the kneaded product and the crosslinking agent to provide a kneaded product containing the conjugated diene-based polymer (A), the basic compound (B), and the crosslinking agent, that is, the polymer composition.

In the second step, an acidic compound is preferably kneaded together with the kneaded product obtained in the first step and the crosslinking agent.

In addition, in the second step, as required, a vulcanization aid and a vulcanization accelerator (vulcanization accelerator according to a compound other than the basic compound (B) and the compound for generation when the basic compound (B) or the compound for generation has a vulcanization-accelerating effect) are also kneaded. Here, when a compound having a vulcanization-accelerating effect is used as the compound for generation in the first step, it is preferred to avoid using the vulcanization accelerator in the second step.

In addition, in the second step, the polymer composition is generally obtained by a technique involving simultaneously kneading all the components to be subjected to the second step (specifically, the kneaded product obtained in the first step, the crosslinking agent, and the acidic compound and other components, such as the vulcanization aid and the vulcanization accelerator, which are subjected to the second step as required).

When the acidic compound is subjected to the second step, the polymer composition to be obtained becomes more excellent in processability, and the crosslinked polymer to be formed from the polymer composition has a more excellent low hysteresis loss property. Further, when the polymer composition contains fillers (specifically, silica and carbon black), the dispersibility of the fillers can be made more satisfactory.

In the second step, the kneading machine used in the first step may be used. In addition, in the second step, a kneading temperature is set to from 30° C. to 130° C., preferably from 50° C. to 110° C. When the kneading temperature in the second step is 130° C. or more, there is a risk in that the processability of the polymer composition to be obtained may be degraded.

Each component to be used in the second step is described in detail below.

<Crosslinking Agent>

Examples of the crosslinking agent include vulcanizing agents, such as sulfur, a sulfur halide, an organic peroxide, a quinone dioxime, an organic polyamine compound, and an alkylphenol resin having a methylol group. Of those, sulfur is generally used as the crosslinking agent.

The use ratio of the crosslinking agent is preferably from 0.1 part by mass to 10 parts by mass, more preferably from 0.5 part by mass to 5 parts by mass with respect to 100 parts by mass of the polymer components. When the use ratio of the crosslinking agent falls within the above-mentioned ranges, the progress of crosslinking during the kneading can be suppressed, and besides, the physical properties of the crosslinked polymer to be obtained become satisfactory. When any of the above-mentioned vulcanizing agents is used as the crosslinking agent, a vulcanization accelerator may be used in combination therewith.

<Acidic Compound>

Saturated fatty acids having 12 to 24 carbon atoms and metal salts thereof are each suitably used as the acidic compound. Specific examples of the acidic compound include lauric acid, tridecylic acid, myristic acid, pentadecylic acid, palmitic acid, margaric acid, stearic acid, nonadecylic acid, arachidic acid, heneicosylic acid, behenic acid, tricosylic acid, lignoceric acid, and calcium salts and zinc salts of these saturated fatty acids. Those acidic compounds may be used alone or in combination thereof. Of those, stearic acid is preferred. The use ratio of the acidic compound is preferably from 0.3 part by mass to 15 parts by mass with respect to 100 parts by mass of the polymer components.

<Vulcanization Aid>

An example of the vulcanization aid is zinc oxide. The use ratio of the vulcanization aid is preferably from 1 part by mass to 5 parts by mass with respect to 100 parts by mass of the polymer components.

<Vulcanization Accelerator>

Examples of the vulcanization accelerator include a guanidine-based compound, an aldehyde-amine-based compound, an aldehyde-ammonia-based compound, a thiazole-based compound, a sulfenamide-based compound, a thiourea-based compound, a thiuram-based compound, a dithiocarbamate-based compound, and a xanthate-based compound. Preferred specific examples of the vulcanization accelerator include sulfenamide-based vulcanization accelerators, such as N-cyclohexyl-2-benzothiazyl sulfenamide (CBS) and N-tetra-butyl-2-benzothiazyl sulfenamide (TBBS). The use ratio of the vulcanization accelerator is appropriately decided in consideration of the kind and use ratio of the basic compound, but is preferably from 0.5 part by mass to 5 parts by mass with respect to 100 parts by mass of the polymer components.

1.3. Action and Effect

The polymer composition obtained by the production method according to this embodiment as described above is an unvulcanized polymer composition, and forms a crosslinked polymer by, for example, being subjected to crosslinking treatment such as vulcanization.

In addition, in the method of producing a polymer composition according to this embodiment, the basic compound (B) is kneaded together with the conjugated diene-based polymer (A), and the resultant kneaded product and the crosslinking agent are kneaded. Accordingly, despite the blending of the conjugated diene-based polymer (A) as a polymer component, the processability can be improved while excellent low fuel consumption performance of the conjugated diene-based polymer (A) is maintained. In addition, when the polymer composition to be obtained contains a filler, the dispersibility of the filler can be improved.

Thus, according to the method of producing a polymer composition according to this embodiment, there can be obtained a polymer composition that contains the conjugated diene-based polymer (A), and that achieves excellent processability, and when containing a filler, achieves satisfactory dispersibility of the filler.

Such effects of the method of producing a polymer composition according to this embodiment are remarkable when the conjugated diene-based polymer is a reaction product between an active polymerization end and the compound represented by any one of the general formulae (1) to (3).

1.4. Applications

A crosslinked polymer formed from the polymer composition obtained by the production method according to this embodiment is suitably used in a tire, specifically, the tread of a tire. A tire thus obtained obtains high strength at its tread, and also obtains a desired shape at its tread, and hence obtains excellent performance. In addition, the crosslinked polymer may also be used as, for example, a tire member other than the tread, a vibration-proof rubber, a fender, a belt, a hose, and other industrial products.

2. Examples

Specific examples of the invention are described below, but the invention is by no means limited to these Examples. The term "%" in Production Examples, Examples, and Comparative Examples below is by mass, unless otherwise stated.

2.1. Production Examples and Physical Property Measurement of Conjugated Diene-Based Polymer (A)

Production Example 1

An autoclave reactor having an internal volume of 5 liters, which had been purged with nitrogen, was loaded with 2,500 g of cyclohexane, 50 g of tetrahydrofuran serving as a vinyl group content-adjusting agent (randomizer), and 125 g of styrene and 365 g of 1,3-butadiene serving as monomers. After the temperature of the contents of the reactor had been adjusted to 10° C., 5.20 mmol of n-butyllithium was added as a polymerization initiator to initiate polymerization. The polymerization was performed under a thermally insulated condition, and the highest temperature reached 85° C.

At the time point when a polymerization conversion rate of 99% was achieved (after a lapse of 25 minutes from the initiation of the polymerization), 10 g of 1,3-butadiene was added over 1 minute. After that, 1.15 mmol of N-(3-imidazolylpropyl)-N,N-bis(3-triethoxysilylpropyl)amine was added as a modifier, and the mixture was subjected to a reaction for 15 minutes. Here, sampling was performed immediately before the addition of the modifier in order to measure the weight average molecular weight of a polymer before modification.

To the resultant polymer solution containing a modified conjugated diene-based copolymer, 4.40 g of 2,6-di-tert-butyl-p-cresol was added as an anti-aging agent. Then, the solvent was removed by steam stripping, and the residue was dried with a heat roll controlled to a temperature of 110° C. to provide a modified conjugated diene-based copolymer (hereinafter sometimes referred to as "SBR-1").

Production Example 2

A modified conjugated diene-based copolymer (hereinafter sometimes referred to as "SBR-2") was obtained by performing the same operations as in Production Example 1 except that 0.767 mmol of tris(3-triethoxysilylpropyl)amine was added in place of N-(3-imidazolylpropyl)-N,N-bis(3-triethoxysilylpropyl)amine.

Production Example 3

A modified conjugated diene-based copolymer (hereinafter sometimes referred to as "SBR-3") was obtained by performing the same operations as in Production Example 1 except that 0.575 mmol of N,N,N',N'-tetrakis(3-triethoxysilylpropyl)-1,3-diaminopropane was added in place of N-(3-imidazolylpropyl)-N,N-bis(3-triethoxysilylpropyl)amine.

Production Example 4

A modified conjugated diene-based copolymer (hereinafter sometimes referred to as "SBR-4") was obtained by performing the same operations as in Production Example 1 except that 0.767 mmol of 3-(2,2-diethoxy-1,2-azasilolidin-1-yl)-N,N-bis(3-(triethoxysilyl)propyl)propan-1-amine was added in place of N-(3-imidazolylpropyl)-N,N-bis(3-triethoxysilylpropyl)amine.

Production Example 5

A conjugated diene-based copolymer (hereinafter sometimes referred to as "SBR-5") was obtained by performing the same operations as in Production Example 1 except that 2.30 mmol of dimethyldiethoxysilane was added in place of N-(3-imidazolylpropyl)-N,N-bis(3-triethoxysilylpropyl)amine.

<Bound Styrene Content (Content Ratio of Structural Unit Derived from Styrene)>

A bound styrene content was determined by 500 MHz $^1$H-NMR.

<Vinyl Group Content>

A vinyl group content was determined by 500 MHz $^1$H-NMR.

<Measurement of Weight Average Molecular Weight (Mw) Before Modification>

A weight average molecular weight (Mw) was calculated in terms of polystyrene through use of gel permeation chromatography (GPC) ("HLC-8120" manufactured by Tosoh Corporation) from a retention time corresponding to the apex of the maximum peak of a GPC curve obtained under the following GPC conditions.

(GPC Conditions)

Column: product name "GMHXL" (manufactured by Tosoh Corporation)×2

Column temperature: 40° C.

Mobile phase: tetrahydrofuran

Flow rate: 1.0 ml/min

Sample concentration: 10 mg/20 ml

<Mooney Viscosity>

A Mooney viscosity was determined in conformity with JIS K6300-1 using an L rotor under the conditions of 1 minute of preheating, a rotor operation time of 4 minutes, and a temperature of 100° C.

Polymerization formulations for the obtained conjugated diene-based polymers SBR-1 to SBR-5 are shown in Table 1 below, and their physical properties are shown in Table 2 below.

TABLE 1

| Polymerization formulation | | | Production Example 1 | Production Example 2 | Production Example 3 | Production Example 4 | Production Example 5 |
|---|---|---|---|---|---|---|---|
| | Kind of conjugated diene-based polymer | | SBR-1 | SBR-2 | SBR-3 | SBR-4 | SBR-5 |
| Solvent | Cyclohexane | (g) | 2,500 | 2,500 | 2,500 | 2,500 | 2,500 |
| Vinyl group content-adjusting agent | Tetrahydrofuran | (g) | 50 | 50 | 50 | 50 | 50 |
| Monomers | Styrene | (g) | 125 | 125 | 125 | 125 | 125 |
| | 1,3-Butadiene | (g) | 365 | 365 | 365 | 365 | 365 |
| | Additional butadiene | (g) | 10 | 10 | 10 | 10 | 10 |
| Polymerization initiator | n-Butyllithium | (mmol) | 5.20 | 5.20 | 5.20 | 5.20 | 5.20 |
| Modifier | N-(3-Imidazolylpropyl)-N,N-bis(3-triethoxysilylpropyl)amine | (mmol) | 1.15 | — | — | — | — |
| | Tris(3-triethoxysilylpropyl)amine | (mmol) | — | 0.767 | — | — | — |
| | N,N,N',N'-Tetrakis(3-triethoxysilylpropyl)-1,3-diaminopropane | (mmol) | — | — | 0.575 | — | — |
| | 3-(2,2-Diethoxy-1,2-azasilolidin-1-yl)-N,N-bis(3-(triethoxysilyl)propyl)propan-1-amine | (mmol) | — | — | — | 0.767 | — |
| | Dimethyldiethoxysilane | (mmol) | — | — | — | — | 2.30 |
| Anti-aging agent | 2,6-Di-tert-butyl-p-cresol | (g) | 4.40 | 4.40 | 4.40 | 4.40 | 4.40 |

TABLE 2

| | Kind of conjugated diene-based polymer | | | | |
|---|---|---|---|---|---|
| | SBR-1 | SBR-2 | SBR-3 | SBR-4 | SBR-5 |
| Bound styrene content (%) | 25 | 25 | 25 | 25 | 25 |
| Vinyl group content (%) | 58 | 57 | 58 | 57 | 58 |
| Weight average molecular weight (Mw) before modification (×10$^4$) | 21 | 20 | 20 | 21 | 20 |
| Mooney viscosity (ML$_{1+4}$, 100° C.) | 50 | 85 | 78 | 75 | 10 |

2.2. Examples 1 to 3 and 5 to 8 and Comparative Examples 1 to 6

Respective components were blended according to blending formulations shown in Table 3 below, and were kneaded to produce polymer compositions. The kneading was performed by the following method.

Through use of Plastomill (inner capacity: 250 mL) with a temperature control device, as a first step (first-stage kneading), the components blended according to Table 3 below, that is, all the components to be subjected to the first step were simultaneously kneaded under the conditions of a rotational speed of 60 rpm and a kneading time of 4 minutes.

Then, as a second step (second-stage kneading), after the kneaded product obtained in the first step described above had been cooled to room temperature, the components to be subjected to the second step were blended in Plastomill with a temperature control device according to Table 3 below, and were kneaded under the conditions of a rotational speed of 60 rpm and a kneading time of 1.5 minutes to provide each polymer composition.

Next, each resultant polymer composition was molded and subjected to vulcanization molding with a vulcanization press at 160° C. for a predetermined period of time to provide each crosslinked polymer having a predetermined shape to be subjected to evaluation tests described below.

2.3. Example 4

Respective components were blended according to blending formulations shown in Table 3 below, and were kneaded to produce polymer compositions. The kneading was performed by the following method.

Through use of Plastomill (inner capacity: 250 mL) with a temperature control device, as a first step (first-stage kneading), the components other than the silane coupling agent, which had been blended according to Table 3 below, were kneaded under the conditions of a rotational speed of 60 rpm and a kneading time of 2 minutes, and then the silane coupling agent was added and blended therein, followed by further kneading under the conditions of a rotational speed of 60 rpm and a kneading time of 2 minutes.

Then, as a second step (second-stage kneading), after the kneaded product obtained in the first step described above had been cooled to room temperature, the components to be subjected to the second step were blended in Plastomill with a temperature control device according to Table 3 below, and were kneaded under the conditions of a rotational speed of 60 rpm and a kneading time of 1.5 minutes to provide each polymer composition.

Next, each resultant polymer composition was molded and subjected to vulcanization molding with a vulcanization press at 160° C. for a predetermined period of time to provide each crosslinked polymer having a predetermined shape to be subjected to evaluation tests described below.

2.4. Evaluation Method

Each polymer composition and each crosslinked polymer obtained above were subjected to the following evaluation tests. The results are shown in Table 3 below.

<Processability Evaluation Test>

Each unvulcanized kneaded product obtained above in the first step (first-stage kneading) and each unvulcanized kneaded product obtained above in the second step (second-stage kneading) were used as measurement samples, and each of the measurement samples was measured for its Mooney viscosity (ML$_{1+4}$, 100° C.). Table 3 below shows the measured value of the Mooney viscosity (ML$_{1+4}$, 100° C.) as an index with reference to a measured value according to Comparative Example 1 being defined as 100. A higher numerical value for the index indicates more satisfactory processability.

<Low Hysteresis Loss Performance (60° C. Tanδ)>

Each crosslinked polymer obtained above was used as a measurement sample and measured for its 60° C. tanδ using an ARES viscoelasticity testing apparatus (manufactured by TA Instruments) under the conditions of a dynamic shear strain of 3.0%, an angular velocity of 100 radians per second, and a temperature of 60° C. Table 3 below shows an index with respect to a measured value according to Comparative Example 1 being defined as 100, and a higher numerical value for the index indicates a smaller and more satisfactory low hysteresis loss property.

<Filler Dispersibility>

Each crosslinked polymer obtained above was used as a measurement sample, and an elastic modulus difference ΔG' between its elastic modulus at a dynamic shear strain of 0.1% and elastic modulus at a dynamic shear strain of 10.0% was measured using an ARES viscoelasticity testing apparatus (manufactured by TA Instruments) under the conditions of an angular velocity of 100 radians per second and 50° C. Table 3 below shows the measured value of the elastic modulus difference ΔG' as an index with respect to a measured value according to Comparative Example 1 being defined as 100. A higher numerical value for the index indicates more satisfactory dispersibility of the filler.

2.5. Evaluation Results

Table 3 below shows the components used in each step in the production of each polymer composition and their blending ratios, and the results of each evaluation.

TABLE 3

|  |  |  | Examples |  |  |  |  |  |  |  | Comparative Examples |  |  |  |  |  |
|---|---|---|---|---|---|---|---|---|---|---|---|---|---|---|---|---|
|  |  |  | 1 | 2 | 3 | 4 | 5 | 6 | 7 | 8 | 1 | 2 | 3 | 4 | 5 | 6 |
| First step | (A) Conjugated diene-based polymer | SBR-1 (part(s) by mass) | 70 |  |  |  |  |  |  |  | 70 |  |  |  |  |  |
|  |  | SBR-2 (part(s) by mass) |  | 70 | 70 | 70 | 70 | 70 |  |  |  | 70 | 70 |  |  |  |
|  |  | SBR-3 (part(s) by mass) |  |  |  |  |  |  | 70 |  |  |  |  | 70 |  |  |
|  |  | SBR-4 (part(s) by mass) |  |  |  |  |  |  |  | 70 |  |  |  |  |  |  |
|  | Other diene-based polymer | SBR-5 (part(s) by mass) |  |  |  |  |  |  |  |  |  |  |  |  | 70 | 70 |
|  | (B) Basic compound | Basic compound A (pKa = 8.4) (part(s) by mass) | 1.5 | 1.5 | 1.5 | 1.5 |  |  |  | 1.5 |  |  |  |  |  | 1.5 |
|  |  | Basic compound B (pKa = 10.1) (part(s) by mass) |  |  |  |  | 1.5 | 1.5 | 1.5 |  |  |  |  |  |  |  |
|  |  | Basic compound C (pKa = 4.6) (part(s) by mass) |  |  |  |  |  |  |  |  |  |  |  | 1.5 |  |  |
|  |  | Polybutadiene rubber (part(s) by mass) | 30 | 30 | 30 | 30 | 30 | 30 | 30 | 30 | 30 | 30 | 30 | 30 | 30 | 30 |
|  |  | Extender oil (part(s) by mass) | 30 | 30 | 30 | 30 | 30 | 30 | 30 | 30 | 30 | 30 | 30 | 30 | 30 | 30 |
|  |  | Silica (part(s) by mass) | 70 | 70 | 70 | 70 | 70 | 70 | 70 | 70 | 70 | 70 | 70 | 70 | 70 | 70 |
|  |  | Silane coupling agent (part(s) by mass) | 5.6 | 5.6 | 5.6 | 5.6 | 5.6 | 5.6 | 5.6 | 5.6 | 5.6 | 5.6 | 5.6 | 5.6 | 5.6 | 5.6 |
|  |  | Anti-aging agent (part(s) by mass) | 1 | 1 | 1 | 1 | 1 | 1 | 1 | 1 | 1 | 1 | 1 | 1 | 1 | 1 |
| Second step |  | Stearic acid (part(s) by mass) | — | — | 2 | 2 | — | 2 | — | — | — | — | — | — | — | — |
|  |  | Zinc oxide (part(s) by mass) | 3 | 3 | 3 | 3 | 3 | 3 | 3 | 3 | 3 | 3 | 3 | 3 | 3 | 3 |
|  |  | Vulcanization accelerator D (part(s) by mass) | — | — | — | — | — | — | — | — | 1.5 | 1.5 | — | 1.5 | 1.5 | — |
|  |  | Vulcanization accelerator CZ (part(s) by mass) | 1.8 | 1.8 | 1.8 | 1.8 | 1.8 | 1.8 | 1.8 | 1.8 | 1.8 | 1.8 | 1.8 | 1.8 | 1.8 | 1.8 |
|  |  | Sulfur (part(s) by mass) | 1.5 | 1.5 | 1.5 | 1.5 | 1.5 | 1.5 | 1.5 | 1.5 | 1.5 | 1.5 | 1.5 | 1.5 | 1.5 | 1.5 |
| Evaluation test |  | Mooney viscosity after first step ($ML_{1+4}$, 100° C.) | 112 | 111 | 123 | 126 | 115 | 130 | 132 | 115 | 100 | 98 | 102 | 109 | 130 | 131 |
|  |  | Mooney viscosity after second step ($ML_{1-4}$, 100° C.) | 102 | 101 | 107 | 116 | 104 | 114 | 117 | 101 | 100 | 101 | 103 | 98 | 119 | 117 |
|  |  | Low hysteresis loss performance (60° C. tanδ) | 104 | 105 | 110 | 112 | 108 | 113 | 126 | 104 | 100 | 97 | 99 | 105 | 79 | 81 |
|  |  | Filler dispersibility (ΔG') | 109 | 109 | 117 | 132 | 113 | 122 | 125 | 109 | 100 | 98 | 100 | 104 | 81 | 83 |

*1 In the first step, the components other than the silane coupling agent were kneaded for 2 minutes, and then the silane coupling agent was further added thereto and kneaded therewith.

In Table 3 above, a numerical value for each component in the composition of a polymer composition represents parts by mass. The following products were respectively used as the materials shown in Table 3 above.

Basic compound A: manufactured by Tokyo Chemical Industry Co., Ltd., tetrahydro-1,4-oxazine (morpholine), pKa=8.4

Basic compound B: manufactured by Ouchi Shinko Chemical Industrial Co., Ltd., product name "NOCCELER D", 1,3-diphenylguanidine, pKa=10.1

Basic compound C: manufactured by Tokyo Chemical Industry Co., Ltd., aniline, pKa=4.6

Polybutadiene rubber: manufactured by JSR Corporation, product name "BR-01"

Extender oil: manufactured by Japan Energy Corporation, product name "JOMO PROCESS NC-140"

Silica: manufactured by Solvay S. A., product name "ZEOSIL 1165MP"

Silane coupling agent: manufactured by Evonik Japan Co., Ltd., product name "Si75", bis(3-triethoxysilylpropyl) disulfide Anti-aging agent: manufactured by Seiko Chemical Co., Ltd., product name "OZONONE 6C", N-(1,3-dimethylbutyl)-N'-phenyl-p-phenylenediamine Stearic acid: manufactured by NOF Corporation, product name "STEARIC ACID CAMELLIA"

Zinc oxide: manufactured by Mitsui Mining & Smelting Co., Ltd., product name "Zinc oxide No. 1"

Vulcanization accelerator D: manufactured by Ouchi Shinko Chemical Industrial Co., Ltd., product name "NOCCELER D", 1,3-diphenylguanidine Vulcanization accelerator CZ: manufactured by Ouchi Shinko Chemical Industrial Co., Ltd., product name "NOCCELER CZ", N-cyclohexyl-2-benzothiazolylsulfenamide Sulfur: manufactured by Tsurumi Chemical Industry Co., Ltd., product name "Golden Flower Oil Treated Sulfur Powder"

From the results of Table 3 above, it was recognized that, according to the method of producing a polymer composition according to each of Examples 1 to 8, a polymer composition achieving excellent processability, and also being excellent in dispersibility of the filler was obtained, and moreover, it was recognized that the crosslinked polymer formed from such polymer composition had an excellent low hysteresis loss characteristic.

Besides, it was recognized that the processability and the dispersibility of the filler were made even more excellent by subjecting the acidic compound to the second step as in the method of producing a polymer composition according to each of Examples 3, 4, and 6, or post-adding the silane coupling agent as in the method of producing a polymer composition according to Example 4, and it was recognized that the crosslinked polymer formed from such polymer composition had a more excellent low hysteresis loss characteristic.

The invention is not limited to the embodiments described above, and various modifications may be made thereto. The invention includes configurations that are substantially the same (for example, in functions, methods, and results, or in objectives and effects) as the configurations described in the embodiments. The invention also includes configurations obtained by replacing non-essential elements of the configurations described in the embodiments with other elements. The invention also includes configurations having the same effects as those of the configurations described in the embodiments, or configurations capable of achieving the same objectives as those of the configurations described in the embodiments. The invention further includes configurations obtained by adding known art to the configurations described in the embodiments.

The invention claimed is:

1. A method of producing a polymer composition, comprising:
a first step of kneading (A) a conjugated diene-based polymer that is a polymer of a conjugated diene compound or a copolymer of a conjugated diene compound and an aromatic vinyl compound, and is a reaction product of an active polymerization end and a compound represented by any one of the following general formulae (1) to (2), and (B) a basic compound having an acid dissociation constant of 8.0 or more; and
a second step of kneading a kneaded product obtained in the first step and a crosslinking agent:

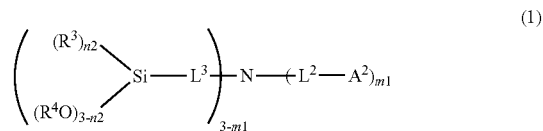

in the formula (1), $A^2$ represents a monovalent group bonded to $L^2$ via an imino group, an amide group, a (thio)carbonyl group, a (thio)carbonyloxy group, a sulfide, or a polysulfide, or represents a protected primary amino group, a protected secondary amino group, a tertiary amino group, a nitrile group, a pyridyl group, a (thio)epoxy group, a (thio)isocyanate group, a (thio)formyl group, a (thio)carboxylic acid ester, a metal salt of a (thio)carboxylic acid ester, a carboxylic halide, or an imidazolyl group, $L^2$ and $L^3$ each independently represent a single bond or a hydrocarbylene group having 1 to 20 carbon atoms, $R^3$ and $R^4$ each independently represent a hydrocarbyl group having 1 to 4 carbon atoms, n2 represents from 0 to 3, and m1 represents 1;

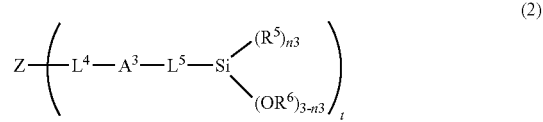

in the formula (2), $A^3$s each independently represent an imino group, an amide group, a (thio)carbonyl group, a (thio)carbonyloxy group, a secondary amino group, or a tertiary amino group, Z represents a nitrogen atom-containing or -free t-valent group having 1 to 20 carbon atoms, $L^4$ represents a single bond or a hydrocarbylene group having 1 to 20 carbon atoms, $L^5$ represents a hydrocarbylene group having 1 to 20 carbon atoms, $R^5$ and $R^6$ each independently represent a hydrocarbyl group having 1 to 4 carbon atoms, n3 represents 0 or 1, and "t" represents 2 or 3.

2. The method of producing a polymer composition according to claim 1, wherein the basic compound having an acid dissociation constant of 8.0 or more is an amine compound.

3. The method of producing a polymer composition according to claim 1, wherein the basic compound having an acid dissociation constant of 8.0 or more is a guanidine-based compound.

4. The method of producing a polymer composition according to claim 1, wherein the second step comprises kneading an acidic compound together with the kneaded product and the crosslinking agent.

5. The method of producing a polymer composition according to claim 4, wherein the acidic compound is a saturated fatty acid having 12 to 24 carbon atoms.

6. The method of producing a polymer composition according to claim 1, wherein the first step comprises kneading silica together with the conjugated diene-based polymer and the basic compound having an acid dissociation constant of 8.0 or more.

7. The method of producing a polymer composition according to claim 6, wherein the first step comprises kneading the conjugated diene-based polymer, the basic compound having an acid dissociation constant of 8.0 or more, and the silica, followed by addition of a silane coupling agent and further kneading.

8. The method of producing a polymer composition according to claim 1, wherein the crosslinking agent is sulfur.

* * * * *